G. H. STAHL.
BALL BEARING RETAINER.
APPLICATION FILED APR. 24, 1913.
1,089,877.
Patented Mar. 10, 1914.
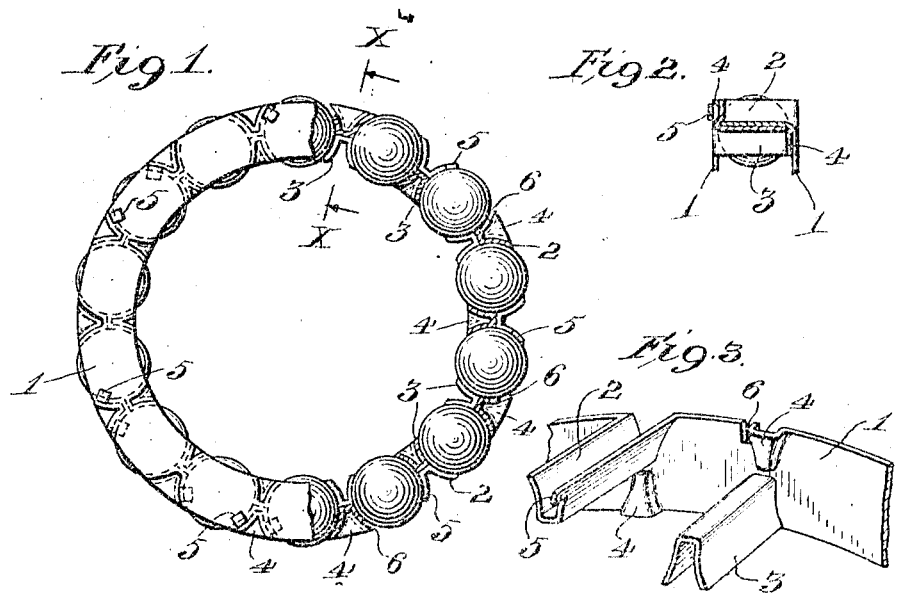
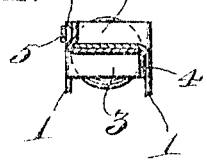
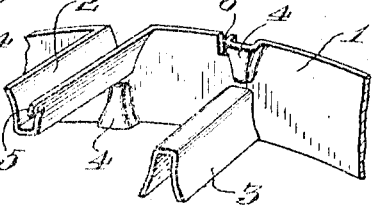
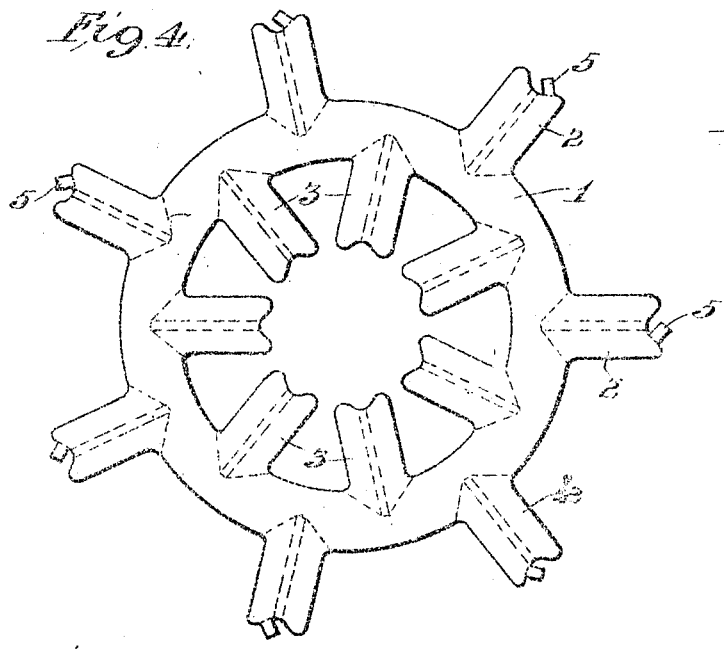
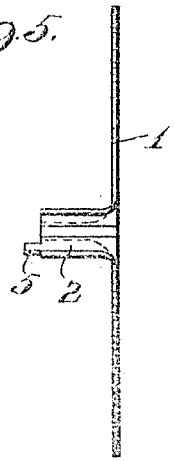
Witnesses:
Henry E. Bul
A. A. Olin
Inventor.
Gustav H. Stahl
By [signature]
His Attorney

UNITED STATES PATENT OFFICE.

GUSTAV H. STAHL, OF CHICAGO, ILLINOIS.

BALL-BEARING RETAINER.

1,089,877.

Specification of Letters Patent.

Patented Mar. 10, 1914.

Application filed April 24, 1913. Serial No. 763,279.

*To all whom it may concern:*

Be it known that I, GUSTAV H. STAHL, a subject of the Emperor of Germany, who have declared my intention of becoming a citizen of the United States, and a resident of the city of Chicago, county of Cook, and State of Illinois, have invented certain new and useful Improvements in Ball-Bearing Retainers, of which the following is a specification.

My invention relates to improvements in ball bearing retainers and has for its object the production of a device of this character which will be of extremely simple construction and efficient in use.

Other objects will appear hereinafter.

The invention consists in the combinations and arrangements of parts hereinafter described and claimed.

The invention will be best understood by reference to the accompanying drawing forming a part of this specification, and in which—

Figure 1 is a side elevation of a ball bearing retainer embodying my invention, one side thereof being broken away in order to better illustrate the construction, Fig. 2 is a section taken on substantially line $x$—$x$ of Fig. 1, Fig. 3 is an enlarged fragmentary perspective view of one of the members comprising the retainer, Fig. 4 is a plan view of the blank from which each of the members comprising the retainer is formed, and Fig. 5 is a view of one of the members of the retainer partly formed.

The preferred form of construction as illustrated in the drawing comprises two members which are counterparts of each other. Said members are formed of sheet metal, each comprising an annular body portion 1 and radially extending projections or ears 2 and 3 provided at the outer and inner edges respectively of the portion 1 as clearly shown in Fig. 4. In the formation of the blank thus constituted into operative form the portions 2 and 3 are bent to extend perpendicularly to the portion 1 or parallel with the axis thereof as clearly shown in Figs. 3 and 5. Each of the portions 2 and 3 is bent longitudinally upon itself in a form substantially wedge-shaped in cross-section.

The projections 2 and 3 are alternately arranged as shown so that when the members comprising the retainer are arranged together the projections 2 of one will be arranged in registration with the projections 3 of the other so as to form spherical sockets for the reception of the bearing balls as clearly shown in Fig. 1. In order to hold the members comprising the retainer against relative movement bosses 4 are formed upon each of the body portions 1 which are adapted to snugly engage or interlock with the outer ends of the projections 2 and 3 as will be readily understood. The projections 2 are formed at their outer ends with ears 5 which are adapted to engage notches 6 provided in the peripheries of the members 1 in order to lock the parts together, the ears 5, after engagement with the notches 6, being bent over or clenched as clearly shown in Fig. 1.

It will be observed that the two parts of the retainer are exactly the same in construction and so that in the manufacture thereof both may be formed from the same die. The construction is extremely simple and may be readily and easily arranged to accommodate a series of bearing balls in the manner shown in Fig. 1.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A ball bearing retainer comprising two annular members counterparts of each other; projections on each of said members coöperating to form spherical sockets for the reception of bearing balls; and bosses on each of said members adapted to interlock with the outer ends of the projections on the other for holding said members against relative movement, substantially as described.

2. A ball bearing retainer comprising two annular members counterparts of each other; projections on each of said members substantially wedge-shaped in cross section coöperating to form spherical sockets for the reception of bearing balls; and bosses on said annular members adapted to engage the free ends of said projections, substantially as described.

3. A ball bearing retainer comprising two annular members counterparts of each other; projections extending from one side of each of said members substantially wedge-shaped in cross-section and having recesses in their free ends, said projections being adapted, when said members are arranged in operative relation with each other, to form spherical sockets for the reception of bearing balls; and bosses on said annular members, each boss engaging one of said recesses, substantially as described.

4. A ball bearing retainer comprising two annular members counterparts of each other, each of said members being formed of a blank of sheet metal, said blank comprising an annular body portion; and projections extending radially from the periphery of said body portion, said projections being bent to extend perpendicular to said body portion and each being bent longitudinally upon itself into a form substantially wedge-shaped in cross-section, the projections of said members being adapted to coöperate with each other to form spherical sockets for the reception of bearing balls; bosses on said annular members adapted to engage the free ends of said projections, and means for locking said members together, substantially as described.

5. A ball bearing retainer comprising two annular members counterparts of each other, each of said members being formed of sheet metal, each comprising an annular body portion and projections formed integral with said body extending perpendicular to said body portion, each of said projections being bent longitudinally upon itself into a form substantially wedge-shaped in cross-section; bosses formed upon the body portion of each of said members, the bosses of each of said members being adapted for engagement by the outer ends of the projections of the other, to hold said members against relative movement; and means for locking said members together, substantially as described.

In testimony whereof I have signed my name to this specification in the presence of two subscribing witnesses.

GUSTAV H. STAHL.

Witnesses:
    JOSHUA R. H. POTTS,
    THOMAS W. COLSON.